No. 676,479.  
B. P. WAGNER.  
BROILER.  
(Application filed Feb. 18, 1901.)  
Patented June 18, 1901.
(No Model.)
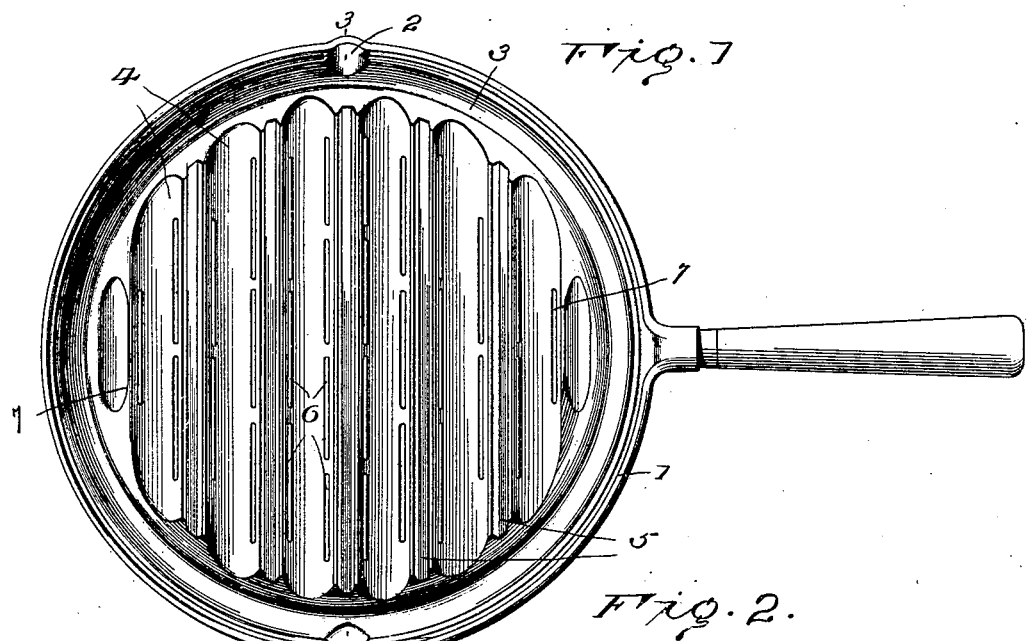
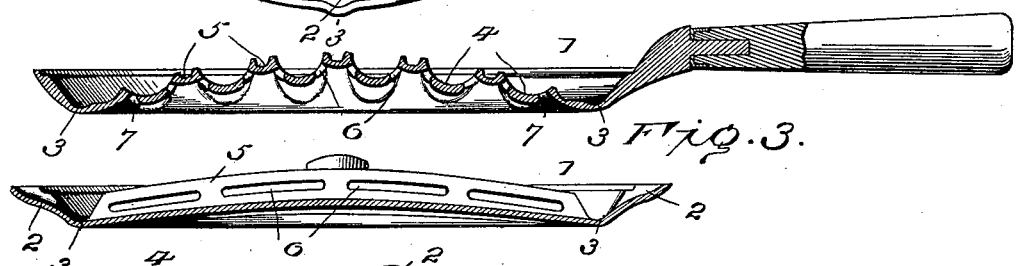
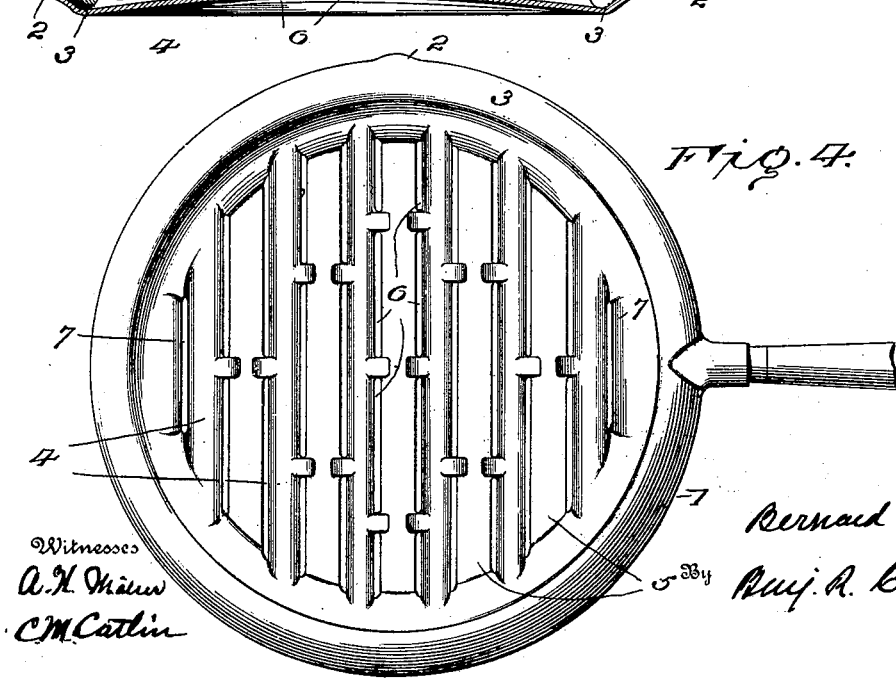
Witnesses  
Inventor  
Bernard P. Wagner  
By  
Attorneys

UNITED STATES PATENT OFFICE.

BERNARD P. WAGNER, OF SIDNEY, OHIO, ASSIGNOR TO WAGNER MANUFACTURING COMPANY, OF SAME PLACE.

BROILER.

SPECIFICATION forming part of Letters Patent No. 676,479, dated June 18, 1901.

Application filed February 18, 1901. Serial No. 47,766. (No model.)

*To all whom it may concern:*

Be it known that I, BERNARD P. WAGNER, a resident of Sidney, in the county of Shelby and State of Ohio, have invented certain new and useful Improvements in Broilers; and I do hereby declare the following to be a full, clear, and exact description of the invention, such as will enable others skilled in the art to which it pertains to make and use the same.

The invention relates to culinary utensils, and particularly to so-called "broilers," and has for its object to prevent meat-juices, melted fats, or other liquids dropping through the utensil when in use.

The invention consists in the construction herein described and pointed out.

In the accompanying drawings, Figure 1 is a plan. Fig. 2 is a central section of the broiler, taken transversely of its bars, the handle being also shown partly in longitudinal section. Fig. 3 is a section on line 3 3 of Fig 1. Fig. 4 is a bottom plan.

Numeral 1 denotes the rim of a broiler, having the usual pouring-spout 2. An interior circumferential trough or channel situated in or near the rim is denoted by 3. This is situated in the lowest part of the bottom of the broiler and near its periphery, as customary.

4 indicates parallel troughs or channels connecting opposite sides of the rim or circumferential channel. These are each at their ends raised above the bottom of channel 3 and arched upwardly toward its longitudinal center.

The channels 4 are separated by the elevated bars 5. These by preference have comparatively narrow channels of the same general form as channels 4. The bars 5 have approximately vertical side walls provided with oppositely-situated horizontal openings 6 to provide for the direct action of heat upon the solid contents of the broiler. 7 indicates short openings outside of the outer channels 4.

The construction is such that juices, fats, or liquids escaping from the article being broiled or cooked are caught in the several channels, and in case they are abundant will flow from the higher channels into the lower and finally into circumferential channel 3.

As the openings 6 are situated in vertical instead of horizontal or approximately horizontal walls, as heretofore, and as no liquid will pass through them onto the fire with consequent burning of their inflammable elements, the offense from burning fat and smoky vapors will be thus avoided, and, further, as the juices and fat of meat, for example, are all retained in the channels they, because of their quantity, are better protected from charring on the broiler and are better preserved for use on the meat or otherwise.

The construction as illustrated operates successfully; but it is obvious that the number and size of the tranverse channels and of the heat-openings 6 may be varied without departing from the invention.

As shown, the number of openings 6 and their respective lengths in the several bars differ, and it may be noted also that the pillars or parts which separate the openings on opposite sides of particular channels 4 are not situated immediately opposite each other. The improvement is not limited in this respect, though the preferred form has been illustrated.

I am aware that it is common to provide broilers with circumferential and transverse channels whereby liquids may be conducted to the former, and such construction is not of my invention, which is characterized by supplementary channels situated on the upper side of bars that separate the main transverse channels.

Having thus described my invention, what I claim as new, and desire to secure by Letters Patent, is—

1. A broiler having a circumferential channel, and transverse channels communicating with said circumferential channel, and having channeled bars situated above and separating said transverse channels, the channels of the upper bars also communicating with the circumferential channel.

2. A broiler having a circumferential channel, and transverse channels communicating with said circumferential channel, and having also bars separating said transverse channels and provided each with an upper channel also communicating with the circumferential channel, said bars having side openings below the upper channels.

In testimony whereof I have signed this specification in the presence of two subscribing witnesses.

BERNARD P. WAGNER.

Witnesses:
 JNO. F. WILSON,
 M. M. WAGNER.